United States Patent Office 3,055,860
Patented Sept. 25, 1962

3,055,860
ANIONIC INITIATORS
Massimo Baer, Longmeadow, and Michael J. Vignale, Springfield, Mass., assignors to Monsanto Chemical Company, St. Louis, Mo., a corporation of Delaware
No Drawing. Filed Sept. 10, 1959, Ser. No. 839,049
7 Claims. (Cl. 260—45.5)

This invention relates to an improved process for the polymerization of anionically-polymerizable vinylidene monomers. More particularly, the invention relates to novel anionic initiators for use in polymerizing such monomers.

It has been known for some time that ion-radical adducts such as sodium naphthalene are useful as initiators in the polymerization of anionically-polymerizable vinylidene monomers. However, use of these known initiators has shown the disadvantages that the reaction initiated by them is very rapid and difficult to control and that they decompose during the course of the reaction to form a soluble hydrocarbon, e.g., naphthalene, as a contaminating by-product.

One object of this invention is to provide an improved process for the polymerization of anionically-polymerizable vinylidene monomers.

Another object is to provide novel anionic initiators for use in the polymerization of such monomers.

A further object is to provide ion-radical adducts which, when used to initiate polymerization of such monomers, permit control of the rate of initiation and do not decompose to form a soluble hydrocarbon as a contaiminating by-product.

These and other objects are attained by initiating the polymerization of an anionically-polymerizable vinylidene monomer by contacting the monomer with an insoluble polymeric ion-radical adduct of an alkali metal and an insoluble, cross-linked polymer containing a plurality of units of an aromatic compound capable of forming an ion-radical adduct with an alkali metal.

The following examples are given to illustrate the invention. Parts mentioned are parts by weight.

EXAMPLE I

*Preparation of Initiator*

A suitable reaction vessel is charged with 300 parts of water, followed by addition of 1 part of bentonite with agitation. The slurry is heated to 65–70° C., and a mixture of 40 parts of vinyl naphthalene, 50 parts of styrene, 10 parts of divinyl benzene, and 1 part of benzoyl peroxide is added thereto. The air in the vessel is purged with nitrogen, and the pressurized vessel contents are heated at 88–90° C. for 20 hours and then at 115–120° C. for 12 hours. The batch is cooled and discharged to a centrifuge where the suspension is collected and washed with hot water. The polymer beads are dried in a forced draft air oven for 12 hours at 110–120° C. and washed with 1,2-dimethoxyethane to form substantially pure beads of cross-linked vinyl naphthalene-styrene-divinyl benzene interpolymer.

A 0.1 molar solution of sodium naphthalene in 1,2-dimethoxyethane is passed through a column containing the polymer beads in order to add sodium to the vinyl naphthalene units of the polymer. The effluent from the column, a solution of naphthalene and sodium naphthalene in 1,2-dimethoxyethane, is collected in a receiver where it is regenerated with an excess of sodium. The resultant sodium naphthalene solution is recycled to the column of polymer beads. The treatment of the polymer with sodium naphthalene solution is continued until the concentration of sodium naphthalene in the effluent solution indicates no further capacity of the polymer to add sodium. The column of polymer beads is then washed with 1,2-dimethoxyethane to remove residual sodium naphthalene and naphthlene. The product of the treatment is an insoluble polymeric ion-radical adduct of sodium and the cross-linked vinyl naphthalene-styrene-divinyl benzene (40:50:10) interpolymer in which sodium has been added to substantially all of the vinyl naphthalene units.

The same procedure of interpolymerizing monomers by suspension polymerization to form beads of a cross-linked polymer and then reacting the beads with an alkali metal naphthalene to form an insoluble polymeric ion-radical adduct is used to prepare the following adducts:

(1) Lithium adduct of a vinyl naphthalene-styrene-divinyl benzene (50:40:10) interpolymer,
(2) Sodium adduct of a vinyl naphthalene-divinyl-benzene (90:10) copolymer, and
(3) Potassium adduct of a vinyl naphthalene-styrene-divinyl benzene (60:30:10) interpolymer.

EXAMPLES II–V

*Use of Initiator*

*Example II.*—A solution of 5 parts of styrene in 1000 parts of 1,2-dimethoxyethane is passed through a column of beads of the sodium/vinyl naphthalene-styrene-divinyl benzene (40:50:10) interpolymer adduct of Example I to activate the styrene, i.e., to form styryl and polystyryl anions. The solution of activated styrene is gradually withdrawn from the vessel containing the column of initiator beads and conducted to a suitable reaction vessel to which 95 parts of styrene are simultaneously and gradually charged through a separate conduit. When the temperature of the reaction mixture ceases to rise, methanol is added to deactivate and precipitate the polymer. The reaction results in substantially quantitative conversion of styrene to polystyrene.

*Example III.*—Example II is repeated with the exception that a column of beads of the lithium/vinyl naphthalene-styrene-divinyl benzene (50:40:10) interpolymer adduct of Example I is substituted for the column of beads of sodium/interpolymer adduct. The reaction results in substantially quantitative conversion of styrene to polystyrene.

*Example IV.*—A suitable reaction vessel is charged with a solution of 100 parts of methyl methacrylate in 1000 parts of 1,2-dimethoxyethane, maintaining the temperature below −30° C. A steel gauze bag containing 1 part of the sodium/vinyl naphthalene-divinyl benzene (90:10) copolymer adduct of Example I is immersed in the solution to activate methyl methacrylate and is then withdrawn from the solution. When the temperature of the reaction mixture ceases to rise, the bag containing the initiator is again immersed to activate methyl methacrylate and is then withdrawn. This procedure of immersing and withdrawing the initiator bag to activate monomer when necessary is repeated until the immersing of the initiator bag has no further effect. Methanol is then added to the reaction mixture to deactivate and precipitate the polymer. The reaction results in substantially quantitative conversion of methyl methacrylate to methyl methacrylate polymer.

*Example V.*—Example IV is repeated with the exceptions that 100 parts of styrene are substituted for the 100 parts of methyl methacrylate and 1 part of the potassium/vinyl naphthalene-styrene-divinyl benzene (60:30:10) interpolymer adduct of Example I is substituted for the 1 part of sodium/copolymer adduct. The reaction results in substantially quantitative conversion of styrene to polystyrene.

The present invention comprises the use of insoluble polymeric ion-radical adducts as initiators for the polymerization of anionically-polymerizable vinylidene monomers. The initiators are adducts of an alkali metal, i.e., Li, Na, K, Rb, or Cs, and an insoluble, cross-linked polymer containing a plurality of units of an aromatic compound capable of forming an ion-radical adduct with an alkali metal.

Particularly suitable polymers to which alkali metal may be added to form the initiators of the invention are insoluble polymers of the dinaphthyl methylene type and insoluble interpolymers of a vinyl or vinyloxy derivative of a condensed ring aromatic hydrocarbon and a cross-linking agent. Such polymers and methods of preparing them are already known to the art. Usually the dinaphthyl methylene-type polymers are prepared by condensing naphthalene or other condensed ring aromatic hydrocarbon with formaldehyde in the presence of a mineral acid or by chloromethylating the condensed ring aromatic hydrocarbon and reacting the chloromethylated compound with zinc.

Polymers of the second type mentioned above are advantageously prepared by suspension polymerization of the monomers to form polymer beads, as demonstrated in Example I, or by impregnating an inert carrier, e.g., silica gel, alumina, calcium sulfate, carbon black, diatomaceous earths, clays, etc., with the monomers and then polymerizing to form a thin coating of polymer on a large surface of the inert carrier. In preparing these polymers, a monomer which contributes units capable of adding alkali metal is interpolymerized with a cross-linking agent and optionally also with one or more other interpolymerizable monomers, e.g., styrene, methyl methacrylate, etc., to form an insoluble polymer containing about 1–20%, preferably 5–10%, by weight of cross-linking agent and preferably containing at least about 30% by weight of units capable of adding alkali metal. These units capable of adding alkali metal can be contributed by monomers such as vinyl naphthalene, vinyl biphenyl, vinyl anthracene, the corresponding vinyloxy derivatives of condensed ring aromatic hydrocarbons, etc. Suitable cross-linking agents include divinyl benzene, divinyl toluenes, divinyl xylenes, divinyl ethylbenzenes, diisopropenylbenzene, trivinyl benzene, divinyl naphthalene, trivinyl naphthalene, polyvinyl anthracenes, etc.

However, since the only requirement of the polymer to which alkali metal is added to form the initiators of the invention is that it be an insoluble, cross-linked polymer containing a plurality of units of an aromatic compound capable of forming an ion-radical adduct with an alkali metal, and since the aromatic compounds capable of adding alkali metal are already well known, various other polymers utilizable in preparing the initiators will be obvious to those skilled in the art.

The initiators of the invention are prepared by reacting these insoluble, cross-linked polymers with an alkali metal to add the alkali metal to the units capable of forming an ion-radical adduct therewith. This reaction can be accomplished by contacting the polymer in any suitable manner with a dispersion of finely-divided alkali metal in an inert liquid medium, e.g., ethers of polyhydric alcohols, with a solution of alkali metal in a solvent such as liquid ammonia, or with a solution of a non-polymeric ion-radical adduct, e.g., sodium naphthalene, in a polar solvent such as 1,2-dimethoxyethane. Hydrocarbons may be used as inert liquid media for dispersion of suitably stable adducts and alkali metals which may be used to prepare such adducts. Preferably, the treatment of the polymer with the alkali metal-containing composition is continued until the capability of the polymer to add alkali metal is exhausted in order to minimize the amount of polymeric adduct required to furnish the amount of alkali metal ion desired to initiate a polymerization reaction. However, this exhaustion of the capability of the polymer to add alkali metal is obviously not required to make the polymeric adducts effective as initiators, particularly when the polymer comprises a large majority of units capable of adding alkali metal. After completion of the treatment of the insoluble polymer with the alkali metal, the polymeric adduct is preferably washed with an inert organic solvent, e.g., 1,2-dimethoxyethane, to remove unreacted alkali metal, alkali metal adduct, or alkali metal adduct residue.

The insoluble polymeric ion-radical adducts of this invention are effective as initiators for the polymerization of anionically-polymerizable vinylidene monomers, such as vinyl aromatic hydrocarbons, e.g., styrene, vinyl toluene, etc., aralkoxy vinyl aromatic compounds, e.g., o-, m-, and p-methoxy-styrenes, etc., conjugated dienes, e.g., butadiene, isoprene, etc., acrylic-type esters, e.g., methyl acrylate, methyl methacrylate, etc. Polymerization is initiated by contacting the anionically-polymerizable vinylidene monomer with the polymeric adduct in any suitable manner, advantageously by passing a dilute solution of monomer through a column of beads of the polymeric adduct or by immersing in the monomer or a solution of the monomer an inert porous bag containing the polymeric adduct, withdrawing the bag after polymerization has been initiated, and again immersing the bag when further contact between the monomer and initiator is required to activate more monomer, thus controlling the rate of initiation.

As will be obvious to those skilled in the art, the amount of polymeric adduct used to initiate polymerization can vary over a very wide range because of the variations in the alkali metal contents of the different adducts and because of the variations in the efficiency with which available alkali metal is utilized when the monomer and adduct are contacted in different manners. The amount of adduct to be used in a particular process can be readily determined by routine experimentation. Assuming adjustment of the parameters to give an efficiency in this utilization of available alkali metal equivalent to the efficiency found when the monomers are polymerized in the presence of the non-polymeric ion-radical adducts of the prior art, the amount of polymeric adduct used would be such that the reaction mixture would contain 0.0003–0.014 gram-atoms of alkali metal per mol of monomer.

The temperatures and pressures used for the polymerization reactions of this invention are those usually used for anionic polymerization reactions, i.e., temperatures ordinarily in the range of −80° to 100° C. under atmospheric or superatmospheric pressures. Polymerization may be conducted by mass or solution polymerization techniques. When solvent polymerization techniques are employed, the monomer usually constitutes 10–55% by weight, based on the weight of solvent. Utilizable solvents include inert organic solvents which are also solvents for the polymer and inert organic solvents which are non-solvents for the polymer, e.g., hexane, benzene, 1,2-dimethoxyethane, tetrahydrofuran, etc. It is preferred that the polymerizations be conducted in the substantial absence of materials capable of yielding active hydrogen under polymerization conditions in order to prevent undue destruction of the catalyst.

The insoluble polymeric ion-radical adducts of the inventions are useful as initiators for the polymerization of anionically-polymerizable vinylidene monomers. Their use in this application is particularly advantageous in that it permits control of the rate of initiation and of the molecular weight and molecular weight distribution of the product and does not result in the formation of soluble hydrocarbons as contaminating residues.

It is obvious that many variations may be made in the products and processes set forth above without departing from the spirit and scope of this invention.

What is claimed is:

1. In a process for polymerizing an anionically-polymerizable vinylidene monomer of the group consisting of vinyl aromatic hydrocarbons, ar-alkoxy vinyl aromatic hydrocarbons, conjugated dienes, methyl acrylate, and methyl methacrylate in the presence of an anionic initiator, the improvement which comprises initiating polymerization by contacting the monomer with an insoluble polymeric ion-radical adduct of an alkali metal of the group consisting of lithium, sodium, and potassium and an insoluble, cross-linked polymer containing a plurality of units of combined vinyl naphthalene.

2. A process as in claim 1 wherein the alkali metal is lithium.

3. A process as in claim 1 wherein the alkali metal is sodium.

4. A process as in claim 1 wherein the alkali metal is potassium.

5. A process as in claim 1 wherein the insoluble, cross-linked polymer is an interpolymer of vinyl naphthalene, styrene, and divinyl benzene.

6. A process as in claim 1 wherein the vinylidene monomer is styrene.

7. A process as in claim 1 wherein the vinylidene monomer is methyl methacrylate.

References Cited in the file of this patent

UNITED STATES PATENTS 2,608,555     Bullitt _____ Aug. 26, 1952

FOREIGN PATENTS 201,396     Australia _____ Apr. 4, 1956

OTHER REFERENCES

Fieser et al.: "Organic Chemistry (pages 335 and 570), Second Edition, published by Reinhold (New York), 1950.